(12) United States Patent
Talarico et al.

(10) Patent No.: US 10,924,156 B2
(45) Date of Patent: Feb. 16, 2021

(54) FREQUENCY HOPPING PATTERN FOR NARROWBAND INTERNET-OF-THINGS IN UNLICENSED SPECTRUM

(71) Applicant: Apple Inc., Cupertino, CA (US)

(72) Inventors: Salvatore Talarico, Sunnyvale, CA (US); Huaning Niu, Milpitas, CA (US); Wenting Chang, Beijing (CN)

(73) Assignee: Apple Inc., Cupertino, CA (US)

( * ) Notice: Subject to any disclaimer, the term of this patent is extended or adjusted under 35 U.S.C. 154(b) by 102 days.

(21) Appl. No.: 16/261,130

(22) Filed: Jan. 29, 2019

(65) Prior Publication Data
US 2019/0158139 A1    May 23, 2019

Related U.S. Application Data

(60) Provisional application No. 62/623,651, filed on Jan. 30, 2018, provisional application No. 62/658,259, filed on Apr. 16, 2018, provisional application No. 62/674,234, filed on May 21, 2018, provisional application No. 62/683,823, filed on Jun. 12, 2018, provisional application No. 62/693,734, filed on Jul. 3, 2018.

(51) Int. Cl.
| | | |
|---|---|---|
| *H04J 3/14* | (2006.01) | |
| *H04L 12/26* | (2006.01) | |
| *H04L 12/28* | (2006.01) | |
| *H04B 1/7143* | (2011.01) | |
| *H04B 1/715* | (2011.01) | |
| *H04W 4/70* | (2018.01) | |
| *H04W 16/14* | (2009.01) | |
| *H04W 4/80* | (2018.01) | |
| *H04W 76/11* | (2018.01) | |

(52) U.S. Cl.
CPC ........... *H04B 1/7143* (2013.01); *H04B 1/715* (2013.01); *H04W 4/70* (2018.02); *H04W 4/80* (2018.02); *H04W 16/14* (2013.01); *H04W 76/11* (2018.02)

(58) Field of Classification Search
CPC combination set(s) only.
See application file for complete search history.

(56) References Cited

U.S. PATENT DOCUMENTS

| | | | | |
|---|---|---|---|---|
| 2017/0134881 | A1* | 5/2017 | Oh ........................ | H04W 56/001 |
| 2019/0149190 | A1* | 5/2019 | Liu ........................ | H04L 5/0012 375/132 |
| 2019/0173521 | A1* | 6/2019 | Liu ........................ | H04B 1/7143 |

* cited by examiner

*Primary Examiner* — Maharishi V Khirodhar
(74) *Attorney, Agent, or Firm* — Kowert, Hood, Munyon, Rankin & Goetzel, P.C.

(57) ABSTRACT

Described herein are methods and apparatus for NB-IoT devices to operate in unlicensed spectrum. Frequency hopping patterns are disclosed that enable compliance with applicable regulations. A base station may be configured to operate in Multefire (MF) narrowband internet of things (NB IoT) cell over unlicensed spectrum. The base station may communicate with one or more wireless devices over a specified number N of data channels separate in frequency. The frequencies of the data channels may be specified by a frequency hopping sequence. The base station may be configured to encode an anchor channel for transmission to the one or more wireless devices at a fixed frequency interspersed in time with the data channels.

20 Claims, 8 Drawing Sheets

| 32 elements sequence | 16 elements sequence | 32 elements sequence | 16 elements sequence | 32 elements sequence | 16 elements sequence |

Option A

| 32 elements sequence | 16 elements sequence | 16 elements sequence | 32 elements sequence | 32 elements sequence | 16 elements sequence |

Option B

FIG. 5

Option A

Option B

Option C

US 10,924,156 B2

FREQUENCY HOPPING PATTERN FOR NARROWBAND INTERNET-OF-THINGS IN UNLICENSED SPECTRUM

PRIORITY CLAIM

This application claims priority to U.S. Provisional Patent Application Ser. No. 62/623,651 filed on Jan. 30, 2018, U.S. Provisional Patent Application Ser. No. 62/658,259 filed on Apr. 16, 2018, U.S. Provisional Patent Application Ser. No. 62/674,234 filed on May 21, 2018, U.S. Provisional Patent Application Ser. No. 62/683,823 filed on Jun. 12, 2018, and U.S. Provisional Patent Application Ser. No. 62/693,734 filed on Jul. 3, 2018, which are all incorporated herein by reference in their entirety.

TECHNICAL FIELD

Embodiments described herein relate generally to wireless networks and communications systems. Some embodiments relate to cellular communication networks including 3GPP (Third Generation Partnership Project) networks, 3GPP LTE (Long Term Evolution) networks, 3GPP LTE-A (LTE Advanced), and 3GPP fifth generation (5G) or new radio (NR) networks, although the scope of the embodiments is not limited in this respect.

BACKGROUND

The Internet of Things (IoT) is a concept in which a large number of computing devices are interconnected to each other and to the Internet to provide functionality and data acquisition at relatively low levels. IoT is envisioned as a significantly important technology component, which has huge potential, and may change our daily life entirely by enabling connectivity between tons of devices.

BRIEF DESCRIPTION OF THE DRAWINGS

FIG. 5 illustrates sequence generation through a concatenation of length-32 and length-16 sequence in accordance with some embodiments.

DETAILED DESCRIPTION

Figure 1:
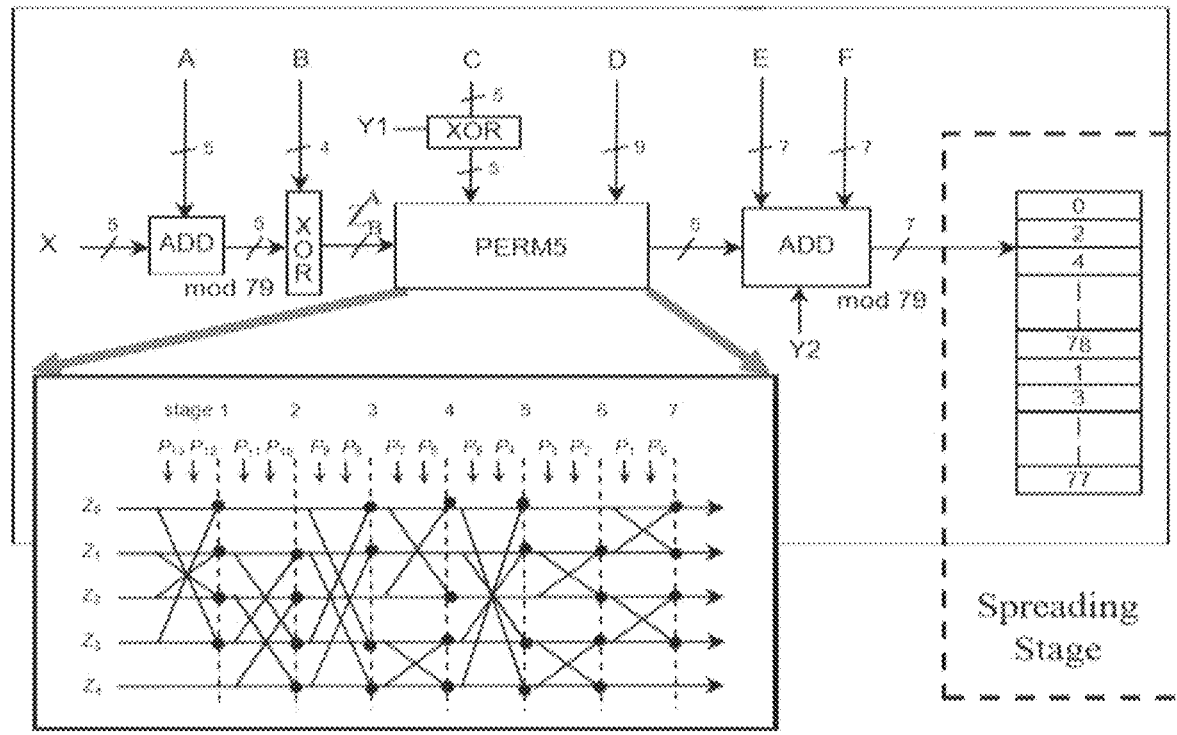
FIG. 1 illustrates a Bluetooth frequency hopping selection kernel.

As used herein, an IoT device (also referred to as a "Machine-Type Communication device" or "MTC device") may include an autonomous or semiautonomous device that performs one or more functions, such as sensing or control, among others, in communication with other IoT devices and a wider network, such as the Internet. Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like. IoT devices (or groups of IoT devices) may be accessible through remote computers, servers, and other systems, for example, to control systems or access data. A group or set of IoT devices that are connected to one another using wired and/or wireless technologies may be referred to as a "network of IoT devices," an "IoT network," or the like.

Networks of IoT devices may be used for a wide variety of applications in various deployment scenarios, including commercial and home automation, smart factories or smart manufacturing, smart cities, smart environment, smart agriculture, and smart health systems. For example, IoT networks may be used for water distribution systems, electric power distribution systems, pipeline control systems, plant control systems, light switches, thermostats, locks, cameras, alarms, motion sensors, and the like.

Third Generation Partnership Project (3GPP) has standardized two designs to support IoT services—enhanced Machine Type Communication (eMTC) and NarrowBand IoT (NB-IoT). As eMTC and NB-IoT UEs will be deployed in huge numbers, lowering the cost of these UEs is a key enabler for implementation of IoT. Also, low power consumption is desirable to extend the life time of the battery. In addition, there are substantial use cases of devices deployed deep inside buildings, which would require coverage enhancement in comparison to the defined LTE cell coverage footprint. In summary, eMTC, and NB-IoT techniques are designed to ensure that the UEs have low cost, low power consumption, and enhanced coverage.

LTE Operation in Unlicensed Spectrum

Both Release (Rel)-13 eMTC and NB-IoT devices operate in licensed spectrum. On the other hand, the scarcity of licensed spectrum in low frequency band results in a deficit in the data rate boost. Thus, there are emerging interests in the operation of LTE systems in unlicensed spectrum.

Potential LTE operation in unlicensed spectrum includes, but is not limited to the Carrier Aggregation based on Licensed Assisted Access (LAA)/enhanced LAA (eLAA) systems, LTE operation in the unlicensed spectrum via dual connectivity (DC), and the standalone LTE system in the unlicensed spectrum, where LTE-based technology solely operates in unlicensed spectrum without requiring an "anchor" in licensed spectrum—called MulteFire. To extend the benefits of LTE IoT designs into unlicensed spectrum, MulteFire 1.1 is expected to specify the design for Unlicensed-IoT (U-IoT). The present disclosure is related to U-IoT systems, with focus on the NB-IoT based design.

Regulations in Unlicensed Spectrum

The target band for narrowband unlicensed IoT is the sub-1 GHz band for both United States (US), European Union (EU), and China. However, the embodiments herein may be applicable to other frequency bands. Regulation defines the operation of such a system for either digital modulation or frequency hopping. Digital modulation requires system BW>500 KHz with power spectral density (PSD) limitation of 8 dBm/3 kHz; while frequency hopping has instead limitations on the duty cycle, and the number of hops. Different number of hops result in different max transmission power. In the EU, for this specific band four new sub-channels have been proposed to be used. These sub-channels are: 865.6 MHz~865.8 MHz, 866.2 MHz~866.4 MHz, 866.8 MHz~867.0 MHz, 867.4 MHz~867.6 MHz. In the EU, the regulation regarding these sub-channels states that: 1) maximum EIRP is 27 dBm; 2) adaptive power control is required; 3) bandwidth is smaller than 200 kHz; 4) the duty cycle for network access points is smaller than 10%, otherwise this is 2.5% for other types of equipment. While operating a NB-IoT system in this band as a digital modulation system is appealing, operating as a FH system provides more benefits: frequency diversity is exploited by operating the system as FH system, while the initial access timing might be longer. More importantly, digital modulation with 3 RB has the same Tx power as FH with 1 RB, which translates in a loss in terms of coverage of about ~5 dB.

Frequency Hopping Pattern

When operating NB-IoT-U as a frequency hopping system, the data channel and the anchor channel hops from one channel to another. For this reason, it is advisable to opportunely design the hopping pattern, such that primary cell (PCell), secondary cell(s) (SCell(s)), and also UEs might be able to know the hopping channel to which the system might hop from a set of minimum information, even though they might not be able to use it due to collisions with incumbent technologies.

Frequency Hopping Sequences

In LTE, there is no concept of frequency hopping sequence since the system does not need to operate in a frequency hopping spread spectrum manner. However, in eMTC-U the design should abide by the regulations in different regions, frequency hopping is the most appropriate forms of modulations, due to more relaxed power spectrum density (PSD) limitation.

In Bluetooth technologies, a signal may rapidly hop among a pre-defined set of channels in a pre-defined order in order to combat narrowband interference, and reduce likelihood of being jammed. In this technology, the hopping sequence is a function of the part of the MAC address (the LAP field which is the lower part of the address containing 24 bits, and upper address part (UAP) field which is the upper part of the address containing 8 bits for a total for 28 bits that we refer here as $A_{27-0}$), and the clock (27 bits may be referred to as $CLK_{27-1}$) of the device. The sequence in this case is generated as illustrated in FIG. 1.

Figure 2:
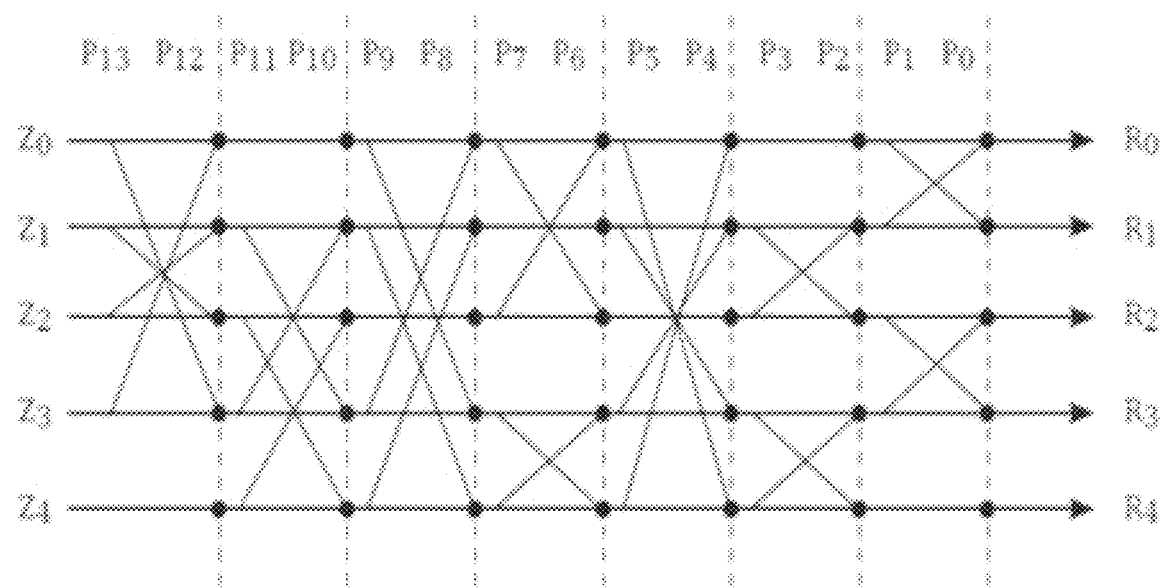
FIG. 2 illustrates the internal structure of the Perm5 operator.
Figure 2:
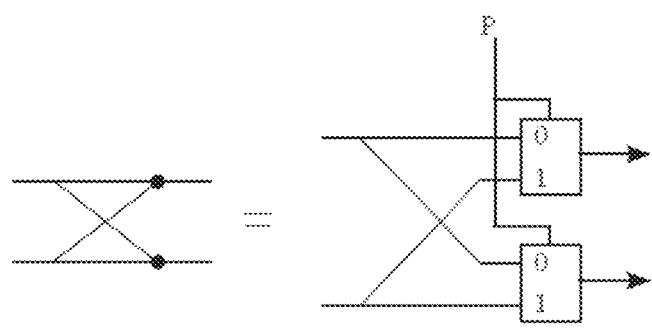

In FIG. 1, Perm5 is the operator permutations, which takes two inputs, a parameter Z and a parameter P, and provide based on P a swapped version of Z on its output R. This block includes 14 cascade cells, where each cell is responsible for swapping two bits. The internal structure of the operator Perm5 block is illustrated in FIG. 2. The cell can constructed by using 2 multiplexer devices, each one is a 2×1 multiplexer. The cell body is illustrated in right side of FIG. 2.

In a WiFi system the frequency hopping pattern is defined by permuting all the frequency channels available defined in Table 38, 39, 40 and 41 of ANSI/IEEE Std 802.11, Part 11: Wireless LAN Medium Access Control (MAC) and Physical layer (PHY) specifications, such that the frequency hopping patter $F_X$ is:

$$F_X = \{f_x(1), f_x(2), \ldots, f_x(p)\} \quad (1)$$

where "$f_x(i)$" is the channel number for the $i^{th}$ frequency in the $n^{th}$ hopping patter, and "p" is the number of frequency channels in hopping pattern. Given the hoping patter number, "x", and the index for the next frequency, "i", the channel number shall be defined to be as follows $$fx(i) = [b(i) + x] \bmod (79) + 2 \text{ in North America and most} \quad (2)$$
of Europe, with $b(i)$ defined in Table 1.

$= [(i-1)'x] \bmod (23) + 73$ in Japan.

$= [b(i) + x] \bmod (27) + 47$ in Spain with $b(i)$ defined in Table 2.

$= [b(i) + x] \bmod (35) + 48$ in France with $b(i)$ defined in Table 3.

TABLE 1

Base hopping sequence b(i) for North America and most of Europe

| i | b(i) |
|---|------|
| 1 | 0 |
| 2 | 23 |
| 3 | 62 |
| 4 | 8 |
| 5 | 43 |
| 6 | 16 |
| 7 | 71 |
| 8 | 47 |
| 9 | 19 |
| 10 | 61 |
| 11 | 76 |
| 12 | 29 |
| 13 | 59 |
| 14 | 22 |
| 15 | 52 |
| 16 | 63 |
| 17 | 26 |
| 18 | 77 |
| 19 | 31 |
| 20 | 2 |
| 21 | 18 |
| 22 | 11 |
| 23 | 36 |
| 24 | 71 |
| 25 | 54 |
| 26 | 69 |
| 27 | 21 |
| 28 | 3 |
| 29 | 37 |
| 30 | 10 |
| 31 | 34 |
| 32 | 66 |
| 33 | 7 |
| 34 | 68 |
| 35 | 75 |
| 36 | 4 |
| 37 | 60 |
| 38 | 27 |
| 39 | 12 |
| 40 | 25 |
| 41 | 14 |
| 42 | 57 |
| 43 | 41 |
| 44 | 74 |
| 45 | 32 |
| 46 | 70 |
| 47 | 9 |
| 48 | 58 |
| 49 | 78 |
| 50 | 45 |
| 51 | 20 |
| 52 | 73 |
| 53 | 64 |
| 54 | 39 |
| 55 | 13 |
| 56 | 33 |
| 57 | 65 |
| 58 | 50 |
| 59 | 56 |
| 60 | 42 |
| 61 | 48 |

TABLE 1-continued

Base hopping sequence b(i) for North America and most of Europe

| i | b(i) |
|---|---|
| 62 | 15 |
| 63 | 5 |
| 64 | 17 |
| 65 | 6 |
| 66 | 67 |
| 67 | 49 |
| 68 | 40 |
| 69 | 1 |
| 70 | 28 |
| 71 | 55 |
| 72 | 35 |
| 73 | 53 |
| 74 | 24 |
| 75 | 44 |
| 76 | 51 |
| 77 | 38 |
| 78 | 30 |
| 79 | 46 |

TABLE 2

Base hopping sequence b(i) for Spain

| i | b(i) |
|---|---|
| 1 | 13 |
| 2 | 4 |
| 3 | 24 |
| 4 | 18 |
| 5 | 5 |
| 6 | 12 |
| 7 | 3 |
| 8 | 10 |
| 9 | 25 |
| 10 | 19 |
| 11 | 8 |
| 12 | 23 |
| 13 | 15 |
| 14 | 22 |
| 15 | 9 |
| 16 | 21 |
| 17 | 9 |
| 18 | 6 |
| 19 | 14 |
| 20 | 1 |
| 21 | 20 |
| 22 | 7 |
| 23 | 16 |
| 24 | 2 |
| 25 | 11 |
| 26 | 17 |
| 27 | 26 |

TABLE 3

Base hopping sequence b(i) for France

| i | b(i) |
|---|---|
| 1 | 17 |
| 2 | 5 |
| 3 | 18 |
| 4 | 32 |
| 5 | 23 |
| 6 | 7 |
| 7 | 16 |
| 8 | 4 |
| 9 | 13 |
| 10 | 33 |

TABLE 3-continued

Base hopping sequence b(i) for France

| i | b(i) |
|---|---|
| 11 | 26 |
| 12 | 10 |
| 13 | 33 |
| 14 | 20 |
| 15 | 29 |
| 16 | 22 |
| 17 | 12 |
| 18 | 6 |
| 19 | 23 |
| 20 | 14 |
| 21 | 25 |
| 22 | 0 |
| 23 | 8 |
| 24 | 1 |
| 25 | 15 |
| 26 | 3 |
| 27 | 11 |
| 28 | 30 |
| 29 | 24 |
| 30 | 9 |
| 31 | 27 |
| 32 | 19 |
| 33 | 2 |
| 34 | 21 |
| 35 | 34 |

NB-IoT-U Frequency Hopping Sequences

In NB-IoT-U, as mentioned above, if the system is operated as a frequency hopping system the channels hops from one channel to another. However, differently than eMTC-U, NB-IoT-U does not rely on channel access procedures such as LBT. In order to provide, the UE(s), PCell and SCell(s) the knowledge related to channel to which the system hops, in the following a few options on how to design a hopping sequence are provided. In embodiments, in order to univocally generate a hopping sequence, this is a function of the SFN (system frame number of subframe number), or hyper frame number (HFN), and also the PCI (physical cell identity), which may reduce the likelihood of collisions during MCO operation or concurrent use of resources.

In embodiments, the hopping sequence includes either data channels and the anchor channel. In embodiments, each anchor channel refers to a specific set of channels, and each anchor channel would refer to its own hopping sequence for the data channels included in the set. In embodiments, multiple anchor channels are supported, and in addition to have a hopping sequence for each anchor channel, there is also a frequency sequence pattern for the anchor channels. Embodiments herein provide different options on how to design a frequency hopping pattern for either the anchor channel or the data channels. In the following discussion, the embodiments may assume 5 anchor channels are supported, and 50 data channels are used, but the principles and options provided herein may be applicable to systems comprising any number of anchor channels and/or any number of data channels.

Hopping Sequence for Anchor Channel

In embodiments, multiple anchor channels are supported, e.g., $N_{Anch}=5$. In embodiments, the frequency hopping pattern for multiple anchor channels is fixed. In embodiments, only one anchor channel is supported, and it always occur on the same frequency. In embodiments, if multiple anchor channels are supported, in order to minimize co-channel interference, the set of channels comprising $N_{Anch}$ elements, which form the set of anchor channels are selected such that they are far apart from each other. For instance given $Y=\{Y_1, Y_2, \ldots Y_{NAnch}\}$, the set of anchor channels $|Y_i-Y_j|>M$, for all i and j. In embodiments, the frequency hopping sequence for data channels and anchor channels is defined separately. In embodiments, given a set of anchor channel Y comprising $N_{Anch}$ channels, which is a predefined set or configured through higher layer signaling, a hopping sequence can be formed by using one of the methods provided herein.

In embodiments, the hopping sequence is givens as $Y(F_X)$, where $F_X=\{f_x(1), f_x(2), \ldots f_x(p)\}$ is formed in a similar manner as Wi-Fi. For instance $$f_x(i)=[b_x(i)+x] \bmod N_{Anch} \quad (3)$$

where x is proportional to PCI, SFN or the HFN, while $b_x(i)$ is table similar to Table 1-3 above, which is uniquely defined for each value of PCI and or SFN/HFN, and contain K elements, where K is the periodicity of the sequence. In embodiments, once all the permutations of $N_{Anch}$ elements are formed, the table $b_x(i)$ is formed by down-selecting some specific elements. In embodiments, in order to mitigate inter-cell interference, different tables are formed for different PCI values.

In embodiments, a pre-defined base pattern is introduced, which can be one of the elements of the full permutations of $N_{Anch}$ elements minus one, for instance if $N_{Anch}=5$, the sequence could be $b(i)=\{0, 3, 2, 4, 1\}$. In embodiments, the initial sequence is obtained from Table I, by selecting the sequence of elements lower than $N_{Anch}$, which lead to the sequence $b(i)=\{0,1,3,2,4\}$ if $N_{Anch}=5$.

In embodiments, the base sequence can be generated through a linear congruential generator. In embodiments, the base sequence is generated as follows:

$$b(i)=[A*i+B] \bmod N_{Anch} \quad (4)$$

where A and B can be fixed or higher layer configurable. In one example, A=2 and $B=N_{Anch}-1$.

Once the base sequence is selected, the sequence can be as follows:

$$F_X=b(W)+Q \bmod N_{Anch} \quad (5)$$

In embodiments, W and Q depend on PCI value, SFN/HFN, or a parameter proportional to the periodicity of the anchor channel, which indicates the frame number over which a transmission over the anchor channel occur. As an example, $W=PCI_0^{N_{Anch}}$ xor $HFN_0^{N_{Anch}}$ and $Q=HFN_{end:1}^{N_{Anch}}$ where $A_{x:y}^{N_{Anch}}$ indicates that bit x to y are used for a representation of A in base $N_{Anch}$. In embodiments, given the base sequence $b(i)$, a circular shift can be applied to it to form the hopping sequence, as follows:

a. Given the base sequence $b(i)$, a circular shift version can be formed as follows:

$$b'(i)=\text{circshit}(b(i),Q) \quad (6)$$

where $Q=HFN_{end:1}^{N_{Anch}}$ b. The hopping sequence can be formed as $$F_X=[b'(i)+Q] \bmod N_{Anch} \quad (7)$$

In embodiments, once the base sequence is selected, the hopping sequence is generated similarly as in Bluetooth by applying a permutation operator "Perm" as follows:

$$F_X=\text{Perm}[X,P,T] \quad (8)$$

where $$X=[b+Q] \bmod N_{Anch} \quad (9)$$

and P and T are function of PCI and/or HFN/SFN. In embodiments, $$X=[b'+Q] \bmod N_{Anch} \quad (10)$$

where b' is obtained as a cyclic shift version of the base sequence b, as for example as it is given in equation (6). In one example, $Q=HFN_{end:1}^{N_{Anch}}$ where $A_{x:y}^{N_{Anch}}$ indicates that bit x to y are used for a representation of A in base $N_{Anch}$. In embodiments, the Perm function is obtained by reusing the Perm5 function defined in Bluetooth standard with some modification: for instance the input parameter Z is a sequence of values and not a binary representation of a value, and P is function of PCI and SFN/HFN. The operator Perm has as input the base sequence b or b', and has two control inputs:

a. The vector of bits P, which controls the swapping cells, whose functionality is described in the lower illustration in FIG. 3.
b. A control value T, which is the control information of a multiplexer, which provides as output a single decimal value $R_0$, which can be one of the values within the set $\{b'_0, b'_2, b'_3, b'_4,\}$ depending on the value of T. For instance if T=0, $R_0=b'_0$; if T=1, $R_0=b'_1$; if T=2, $R_0=b'_2$; if T=3, $R_0=b'_3$; if T=4, $R_0=b'_4$.

Figure 3:
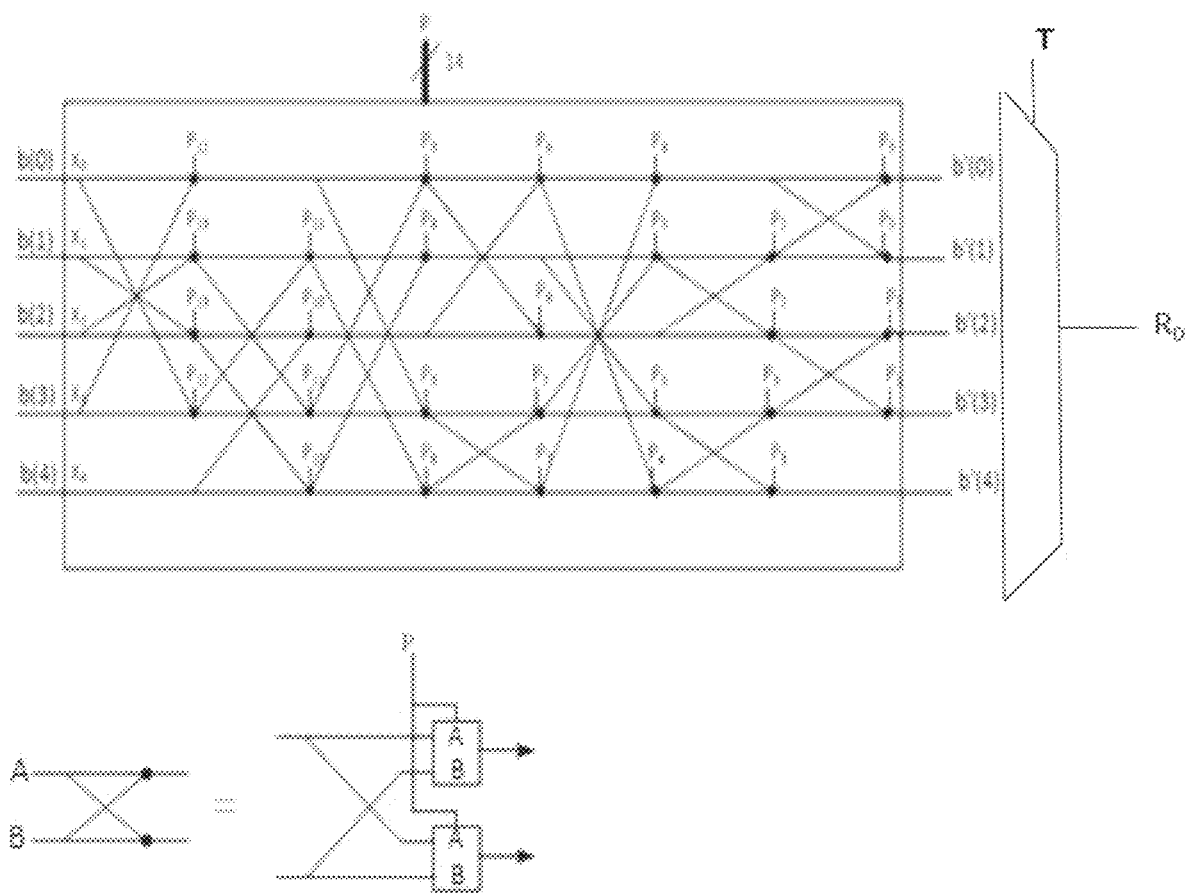
FIG. 3. illustrates a modified Perm5 operator in accordance with some embodiments.

The structure of the operator Perm is illustrated in FIG. 3. In embodiments, as an example $P_{13:0}=[PCI+512*HFN_{end:1}^{N_{Anch}}] \bmod 4096$ or $P_{13:0}=[PCI*N_{Anch}^{\hat{}}(\text{lend}:1|)+HFN_{end:1}^{N_{Anch}}] \bmod 4096$. In embodiments, $T=HFN \bmod N_{Anch}$. In embodiments, if $N_{Anch}=5$ the modified Perm5 operator described in FIG. 3 can be used as is. In one, embodiment, if $N_{Anch}<5$, only few of the swapping cells are used to scramble the first $N_{Anch}$ rows. For example, if $N_{Anch}=4$, $P_{\{10,8,7,4,3\}}=0$, while for instance $P_{\{13,12,11,9,6,5,2,1,0\}}=[HFN_{end:1}^{N_{Anch}}+PCI] \bmod 512$. In this case, $T=HFN \bmod 4$ meaning that $R_0$ can only assume value $R_0=\{b'_0, b'_1, b'_2, b'_3\}$.

General Hopping Sequence without Constraint

In embodiments, the NB-IoT-U system operates as a frequency hopping system. In embodiments, the frequency hopping sequence provides the pattern for both anchor channels and data channels. In embodiments, the frequency hopping sequence provides for data channels and anchor channels is defined separately. In embodiments, given a set of frequencies Y comprising $N_{chan}$ channels, which is pre-defined, or indicated through MIB or SIB, a hopping sequence can be formed by using one of the methods provided in this section. In embodiments, the hopping sequence $Y(F_X)$, where $F_X$ is formed in a similar manner as Wi-Fi. For instance $$F_X=[b(i)+x] \bmod N_{chan} \quad (11)$$

where x is proportional to PCI, SFN or the HFN, while b(i) is table similar to Table 1-3 above, which is uniquely defined for each value of PCI and or SFN/HFN, and contain K elements, where K is the periodicity of the sequence. In embodiments, the value of i is proportional to SFN/HFN. In embodiments, once all the permutations of $N_{chan}$ elements are formed, and the table b(i) is created by down-selecting some specific elements from the total set of permutations. In embodiments, in order to mitigate inter-cell interference, different tables are formed for different PCI values. In embodiments, a pre-defined base pattern is introduced, which can be one of the elements of the full permutations of $N_{chan}$. In embodiments, the initial sequence is obtained from Table I, by selecting the sequence of elements lower than $N_{chan}$, which leads to the sequence provided in Table 4, in case $N_{chan}=50$.

TABLE 4 b(i) sequence

| i | b(i) |
| --- | --- |
| 1 | 0 |
| 2 | 23 |
| 3 | 8 |
| 4 | 43 |
| 5 | 16 |
| 6 | 47 |
| 7 | 19 |
| 8 | 29 |
| 9 | 22 |
| 10 | 26 |
| 11 | 31 |
| 12 | 2 |
| 13 | 18 |
| 14 | 11 |
| 15 | 36 |
| 16 | 21 |
| 17 | 3 |
| 18 | 37 |
| 19 | 10 |
| 20 | 34 |
| 21 | 7 |
| 22 | 4 |
| 23 | 27 |
| 24 | 12 |
| 25 | 25 |
| 26 | 14 |
| 27 | 41 |
| 28 | 32 |
| 29 | 9 |
| 30 | 45 |
| 31 | 20 |
| 32 | 39 |
| 33 | 13 |
| 34 | 33 |
| 35 | 42 |
| 36 | 48 |
| 37 | 15 |
| 38 | 5 |
| 39 | 17 |
| 40 | 6 |
| 41 | 49 |
| 42 | 40 |
| 43 | 1 |
| 44 | 28 |
| 45 | 35 |
| 46 | 24 |
| 47 | 44 |
| 48 | 38 |
| 49 | 30 |
| 50 | 36 |

In embodiments, the base sequence can be generated through a linear congruential generator. In embodiments, the base sequence is generated as follows:

$$b(i)=[A*i+B] \bmod N_{chan} \quad (12)$$

where A and B can be fixed or higher layer configurable. In one example, A=9 and B=$N_{Anch}$−1.

In embodiments, once the base sequence is selected, the sequence can be obtained as follows:

$$F_X=[b(W)+Q] \bmod N_{chan} \quad (13)$$

In embodiments, W and Q depend on PCI value, SFN/HFN: As an example, $W=PCI_0^{N_{Chan}}$ xor $HFN_0^{N_{Chan}}$ and $Q=HFN_{end:1}^{N_{Chan}}$ where $A_{x:y}^{N_{Chan}}$ indicates that bit x to y are used for a representation of A in base $N_{Chan}$. In embodiments, given the base sequence b(i), a circular shift can be applied to it to form the hopping sequence as follows:

a. Given the base sequence b(i), a circular shift version can be formed as follows:

$$b'(i)=\text{circshift}(b(i),Q) \quad (14)$$

where Q is proportional to the SFN/HFN. As an example, $Q=HFN_{end:1}^{N_{Chan}}$ b. The hopping sequence can be formed as $$F_X=[b'(i)+Q] \bmod_{Chan} \quad (15)$$

In embodiments, the hopping sequence is generated similarly as the Bluetooth standard by applying a permutation operator "Perm" as follows:

$$F_X=\text{Perm}[X,P,T] \quad (16)$$

where $$X=[b+Q] \bmod N_{Chan} \quad (17)$$

and P and T are function of PCI and/or HFN/SFN. In embodiments, $$X=[b'+Q] \bmod N_{Chan} \quad (18)$$

where b' is obtained as a cyclic shift version of the base sequence b: as an example b' is given by equation (14). In one example, $Q=HFN_{end:1}^{N_{Chan}}$ where $A_{x:y}^{N_{Chan}}$ indicates that bit x to y are used for a representation of A in base $N_{Chan}$.

Figure 4:
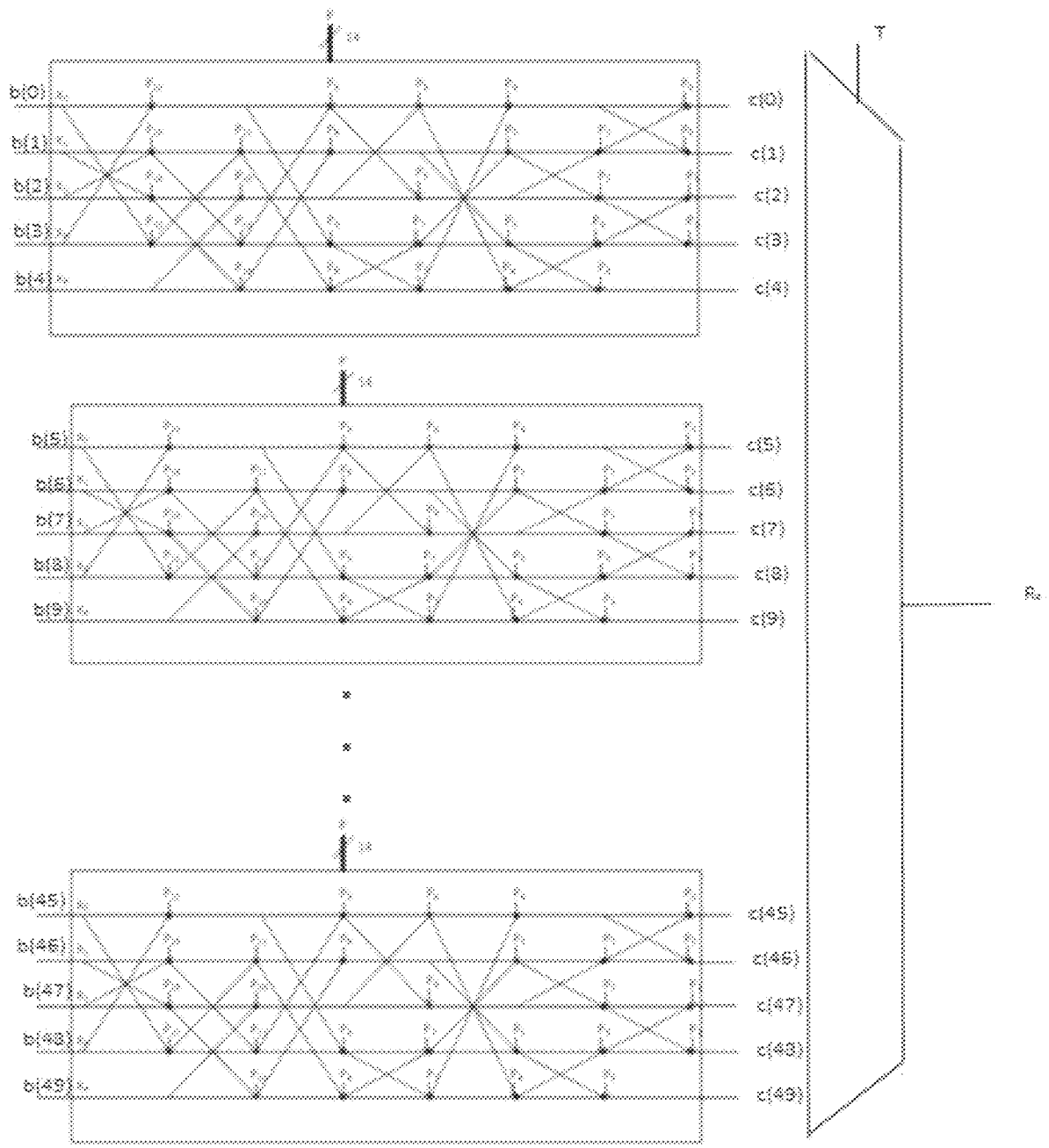
FIG. 4 illustrates a modified Perm5 operator in accordance with some embodiments.

In embodiments, the Perm function is obtained by reusing the Perm5 function defined in Bluetooth standard with some modification as illustrated in FIG. 3. Depending on the value of $N_{Chan}$, multiple modified Perm5 can be used in parallel such that the block Perm can take at least $N_{Chan}$ entries. For instance, for $N_{Chan}$=50, the Perm operator can be as illustrated in FIG. 4. In embodiments, as an example P13:0= $[PCI+512*HFN_{end:1}^{N_{Chan}}] \bmod 4096$ or $P_{13:0}=[PCI*N_{chan}\hat{}(\text{lend}:11)+HFN_{end:1}^{N_{Chan}}] \bmod 4096$. In embodiments, T=HFN mod $N_{Anch}$. In embodiments, if $N_{Chan}$=50 the Perm operator described in FIG. 4 can be used as is. In one, embodiment, if $N_{Chan}$=~50, the Penn operator can be changed such that only $N_{Anch}$ rows are used. This is done either through the control bits or by adjusting the number of repeated elements of the modified Perm5. For example: if $N_{chan}$=45, only 9 modified Perm5 are necessary; if $N_{chan}$=49, 10 modified Perm5 are necessary and $P_{\{10,8,7,4,3\}}$=0, while for instance $P_{\{13,12,11,9,6,5,2,1,0\}}$= $[HFN_{end:1}^{N_{Anch}}+PCI] \bmod 512$ for the last modified Perm5, while for all the others $P_{13:0}=[PCI+512*HFN_{end:1}^{N_{Chan}}] \bmod 4096$ or $P_{13:0}=[PCI*N_{chan}\hat{}(\text{lend}:11)+HFN_{end:1}^{N_{Chan}}] \bmod 4096$. In embodiments, if $N_{Chan}$ is either 16 or 32, the eMTC-U design can be reused, and given a base sequence b(i) the hopping sequence can be generated similarly as Bluetooth by using a Perm5 operator, which is illustrated in FIG. 2, as follows:

$$F_X=\text{Perm5}[X,P] \quad (19)$$

where for $N_{Chan}$=32:

$$X=b(SFN_{4:0} \text{ xor } PCI_{4:0})+SFN_{9:5}, \text{ and } P=SFN_{9:5}+32*PCI \quad (20)$$

while for $N_{Chan}$=16:

$$X=b(SFN_{3:0} \text{ xor } PCI_{3:0})+SFN_{7:4}, \text{ and}$$

$$P_{\{13,12,11,9,6,5,2,1,0\}}=(SFN_{9:4}*8) \text{ xor } PCI, \text{ and} \quad (20)$$

$$P_{\{10,8,7,4,3\}}=0$$

In embodiments, if $N_{Chan}$=48, the hopping sequence can be generated as a concatenation of two sequences: one sequence obtained as if $N_{Chan}$=32 and one sequence obtained as if $N_{Chan}$=16, both following the methodologies provided above. For instance the hopping sequence can be obtained as follows:

$$F_x = \begin{cases} Perm5(X_{32}, P_{32}) & \text{if } T \neq 0 \\ Perm5(X_{16}, P_{16}) & \text{otherwise} \end{cases} \quad (21)$$

where X32, P32, X16, P16, and T depends on PCI, SFN/HFN. In embodiments, given a base sequence composed of 48 elements, the first 32 elements compose a subset of base sequence which we indicate with b32, while the remaining 16 elements compose a subset of the base sequence which we indicate with b16. In embodiments, the first 16 elements of b compose $b_{16}$, while the remaining 32 compose $b_{32}$. In embodiments, if b=[$b_{32}$, $b_{16}$], then as an example $X_{32}$=$b_{32}$ (SFN'$_{4:0}$ xor PCI$_{4:0}$)+SFN$_{9:5}$, P32SFN$_{9:5}$=32*PCI, $X_{16}$=$b_{16}$ (SFN$_{3:0}$ xor PCI$_{3:0}$+32)+SFN$_{7:4}$, and the bit in position {13,12,11,9,6,5,2,1,0} for $P_{16}$ assume the value $P_{16\ \{13,12,11,9,6,5,2,1,0\}}$=(SFN$_{9:4}$*8) xor PCI, while all the rest of the bits have value 0. In embodiments, if b=[$b_{32}$, $b_{16}$], T can be chosen such that the sequence is built as a 32 sequence followed by a 16 sequence, as illustrated in option a of FIG. 5. In another example, the hopping sequence is generated as a 32 sequence followed by a 16 sequence, following a 16 sequence that is followed by a 32 sequence, as illustrated in option b of FIG. 5. Similar embodiments can be made if b=[$b_{16}$, $b_{32}$]. In various embodiments, if $N_{Chan}$=50, the hopping sequence can be generate as a concatenation of three sequences: one sequence obtained as if $N_{Chan}$=32, one sequence obtained as if $N_{Chan}$=16, and one sequence obtained if $N_{Chan}$=2. For the sequence obtained assuming $N_{Chan}$=32, and $N_{Chan}$=16, the methodologies provided above can be used, with some minor changes in some embodiments: the first change is related to SFN' which now needs to be replaced with SFN" which is equal to SFN"=SNF-2*cell(SFN'/50); and the second change is related to the sequence b(i), which will need to be replaced with b' and its generation is provided later in this section.

In various embodiments, the hopping sequence can be obtained according to the following procedure:

a. first form the sequence for $N_{Chan}$=2. In this case, given a sequence b(i) comprising 50 total elements, the sequence for $N_{Chan}$=2 may be obtained by firstly down-selecting only M elements to form a sequence c(i). One of the mechanisms described previously related to anchor channel can be used, where SFN' is substituted with SFN''', wherein SFN'''=SFN"−48*floor(SFN'/50). Additionally, b'=[d, b'$_{32}$, b'$_{16}$], where d comprises two elements, and is a pair of elements obtained from the sequence for $N_{Chan}$=2, while [b'$_{32}$, b'$_{16}$] are all other elements of b which are not yet used to form the sequence for $N_{Chan}$=50.

b. The sequence for $N_{Chan}$=32 is formed as Perm5 ($X_{32}$, $P_{32}$), where $X_{32}$=$b_{32}$(SFN"$_{4:0}$ xor PCI$_{4:0}$)+SFN"$_{9:5}$, $P_{32}$=SFN"$_{9:5}$+32*PCI.

c. The sequence for $N_{Chan}$=16 is formed as Perm5 ($X_{16}$, $P_{16}$), where $X_{16}$=$b_{16}$(SFN"$_{3:0}$ xor PCI$_{3:0}$+32)+SFN"$_{7:4}$, and the bit in position {13,12,11,9,6,5,2,1,0} for $P_{16}$ assume the value $P_{16\ \{13,12,11,9,6,5,2,1,0\}}$=(SFN'''$_{9:4}$*8) xor PCI, while all the rest of the bits have value 0.

Figure 6:
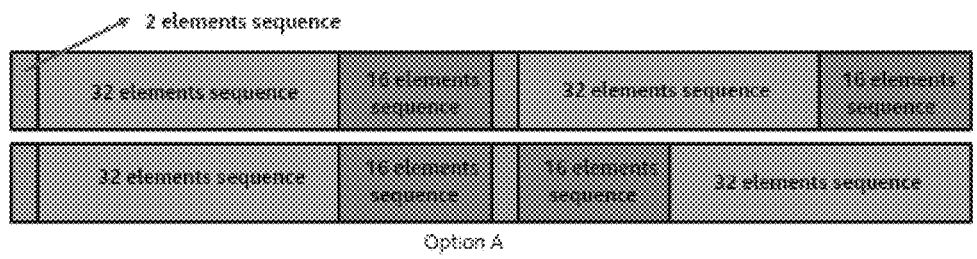
FIG. 6 illustrates an example of sequence generation through a concatenation of length-2, length-32 and length-16 sequence in accordance with some embodiments.
Figure 6:
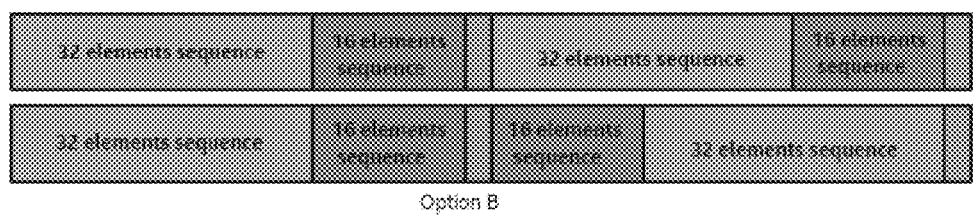
Figure 6:
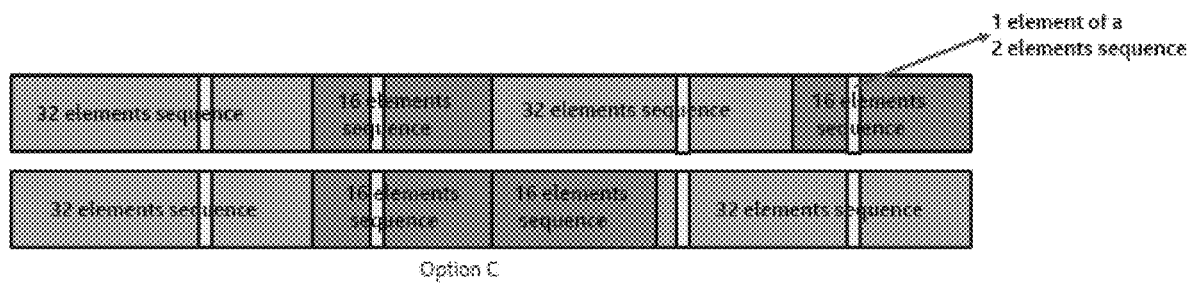

The total sequence is formed by concatenating or continuously flipping sequence for $N_{Chan}$=32 and $N_{Chan}$=16, while the sequence for $N_{Chan}$=2 is added at the beginning, as shown by option A in FIG. 6.

The above described procedure is an illustrative example, and in various embodiments, different variations can be formed using the procedure previously described, such as:

a. Sequence for $N_{Chan}$=2 followed by sequence $N_{Chan}$=32 and $N_{Chan}$=16 (or their flipped version), which is shown by option A in FIG. 6;

b. Sequence $N_{Chan}$=32 and $N_{Chan}$=16 (or their flipped version) followed by sequence for $N_{Chan}$=2, which is shown by option B in FIG. 6;

c. Sequence $N_{Chan}$=2 is in specific positions surrounded by sequence $N_{Chan}$=32 and $N_{Chan}$=16 (or their flipped version), which is shown by option C in FIG. 6.

Figure 7:
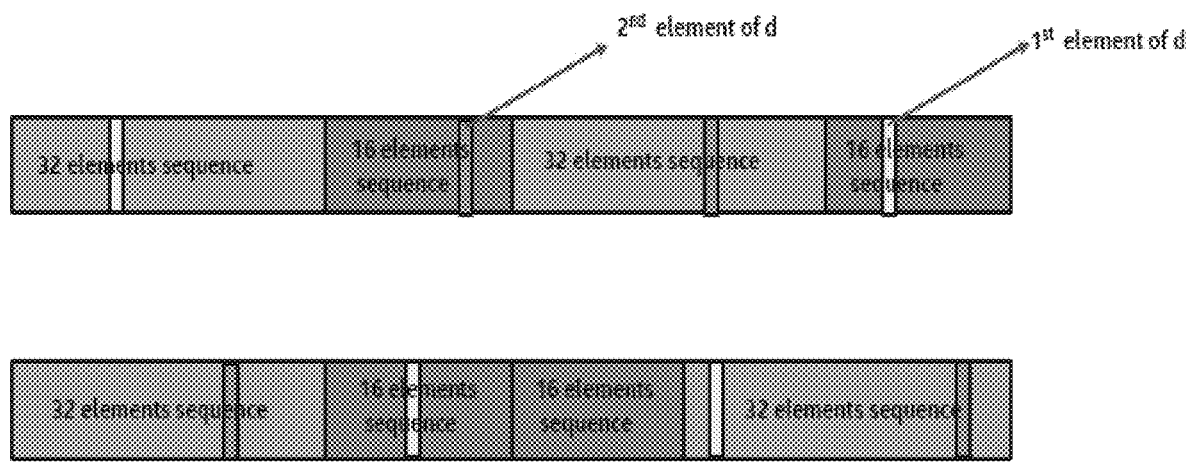
FIG. 7 illustrates an example of sequence generation through a concatenation of length-2, length-32 and length-16 sequence in accordance with some embodiments.

According to various embodiments, as an alternative of the procedure provided above, the sequence can be obtained as follows:

a. First form the sequence for $N_{chan}$=2. In this case, given a sequence b(i) comprises 50 total elements, the sequence for $N_{Chan}$=2 may be obtained by firstly down-selecting only M elements to form a sequence c(i). One of the mechanisms described previously related to anchor channel can be used, where SFN' is substituted with SFN''', wherein SFN'''=SFN"−48*floor (SFN'/50). Additionally, b'=[d, b'$_{32}$, b'$_{16}$], wherein d is fixed and comprises two elements, and the length-2 sequence defines the position of where the two elements in d will appear in the length-50 sequence. b'$_{32}$ and b'$_{16}$ are the rest of elements of the sequence b excluding the two elements in d.

b. The sequence for $N_{Chan}$=32 is formed as Perm5($X_{32}$, $P_{32}$), where $X_{32}$=$b_{32}$(SFN"$_{4:0}$ xor PCI$_{4:0}$)+SFN"$_{9:5}$, $P_{32}$=SFN"$_{9:5}$=32*PCI, and SFN'''=SFN"−48*floor (SFN'/50).

c. The sequence for $N_{Chan}$=16 is formed as perm5 ($X_{16}$, $P_{16}$), where $X_{16}$=$b_{16}$(SFN"$_{3:0}$ xor PCI$_{3:0}$+32)+SFN"$_{7:4}$, and the bit in position {13,12,11,9,6,5,2,1,0} for $P_{16}$ assume the value $P_{16\ \{13,12,11,9,6,5,2,1,0\}}$=(SFN'''$_{9:4}$*8) xor PCI, while all the rest of the bits have value 0. As for the previous step, SFN'''=SFN"−48*floor(SFN'/50). The total sequence is formed by concatenating or continuously flipping sequence for $N_{Chan}$=32 and $N_{Chan}$=16, while the value in d are added in the positions defined through the length-2 sequence. An example is shown by FIG. 7.

The procedures described previously used $N_{Chan}$=50 as an illustrative example, but the embodiments herein may be applicable to any other cases with some modifications. For example, the procedure provided above can be reused in case $N_{Chan}$={51,52, . . . 63} or the like. Consider the case of $N_{Chan}$=64 channels, where 63 channels are for data and one is an anchor channel. If the anchor channel is treated as all the other 63 data channels, and its occurrence must be random, in various embodiments the hopping sequence can be generated as a concatenation of length-32–length (32) sequence, or in alternative as a combination of length-16 and length-32 sequence or only using concatenation of length-16 sequences using one of the methods described above for the case when $N_{Chan}$=48. In various embodiments, the length-16 and length-32 sequences are generated in the same way it has been agreed in eMTC-U to limit specification impact.

In various embodiments, the sequence may be generated as follows:

1. Generate a sequence b(i) containing 64 elements ({0, . . . 63}), that have a specific ordering. In various embodiments, the sequence b(i) is obtained from Table I, by selecting the sequence of elements lower than $N_{Chan}$, which leads to the sequence provided in Table 5.

TABLE 5

| i | b(i) |
|---|---|
| 1 | 0 |
| 2 | 23 |
| 3 | 62 |
| 4 | 8 |
| 5 | 43 |
| 6 | 16 |
| 7 | 47 |
| 8 | 19 |
| 9 | 61 |
| 10 | 29 |
| 11 | 59 |
| 12 | 22 |
| 13 | 52 |
| 14 | 63 |
| 15 | 26 |
| 16 | 31 |
| 17 | 2 |
| 18 | 18 |
| 19 | 11 |
| 20 | 36 |
| 21 | 54 |
| 22 | 21 |
| 23 | 3 |
| 24 | 37 |
| 25 | 10 |
| 26 | 34 |
| 27 | 7 |
| 28 | 4 |
| 29 | 60 |
| 30 | 27 |
| 31 | 12 |
| 32 | 25 |
| 33 | 14 |
| 34 | 57 |
| 35 | 41 |
| 36 | 32 |
| 37 | 9 |
| 38 | 58 |
| 39 | 45 |
| 40 | 20 |
| 41 | 39 |
| 42 | 13 |
| 43 | 33 |
| 44 | 50 |
| 45 | 56 |
| 46 | 42 |
| 47 | 48 |
| 48 | 15 |
| 49 | 5 |
| 50 | 17 |
| 51 | 6 |
| 52 | 49 |
| 53 | 40 |
| 54 | 1 |
| 55 | 28 |
| 56 | 55 |
| 57 | 35 |
| 58 | 53 |
| 59 | 24 |
| 60 | 44 |
| 61 | 51 |
| 62 | 38 |
| 63 | 30 |
| 64 | 46 |

This is only an example and sequence(s) composed by 64 unique elements from 0 to 63, and any other options that are disclosed herein on how to form it can be also used.

3. Divide the sequence into two groups such that $b(i)=[b'(i), b''(i)]$, where $b'$ and $b''$ are both composed by 32 elements each.
4. Scramble the sequence using a new operator Perm6 which is an extension of the operator Perm5, and takes 6 inputs bits and 6 outputs bits and N controlling bits. In this case, the sequence may be generated as follows:

$$F_{x64}=\text{Perm6}[b'(\text{SFN}'_{5:0} \text{ xor } \text{PCI}_{5:0})+\text{SFN}'_{9:6},\text{SFN}'_{9:6}+64*\text{PCI}] \quad (22)$$

In various embodiments, the sequence can be generated using a Perm5 operator as follows. Generate a sequence $c(i)$, which is equivalent to the sequence provided in Table 5 or any other sequence of length-64 composed by 64 unique elements from 0 to 63 using one of the options that discussed herein. The final sequence may be generated as follows from a length-32 sequence obtained using one of the methodologies discussed herein:

$$F_{x64}=c(f(F_{x32}+32*Y)) \quad (23)$$

where $F_{x32}$ is a sequence length-32, for instance $F_{x32}=\text{Perm5}(b_{32},(\text{SFN}'_{4:0} \text{ xor } \text{PCI}_{4:0})+\text{SFN}'_{9:5}, \text{SFN}'_{9:5}+32*\text{PCI})$, while $f(x)$ is a function used to further scramble and randomize the sequence, and Y is a function that provides either value 0 or 1, and it can be function of PCI and SFN'.

As an example,
$Y=\text{SFN}'_5$, Y=which is equivalent to $Y=\text{mod}(\text{floor}(\text{SFN}'/32),2)$;
$Y=\text{SFN}'_0$, which is equivalent to $Y=\text{mod}(\text{SFN}',2)$
$Y=\text{mod}(F_{x32},2)$;

As an example $f(x)$ can be one of following functions:
$f(x)=(x \text{ xor } \text{PCI}_{5:0})+\text{SFN}'_{9:6}$
$f(x)=\text{mod}(x+B, 64)$ where B is proportional to SFN'.

In various embodiments, the length-64 sequence can be generated using a similar procedure by using a concatenation of 4 length-16 sequences, or 1 length-32 and 2 length-16 sequences, but the principles described above would remain the same.

In one embodiment, a sequence with a longer periodicity can be generated. For instance, the sequence can be expanded from 1024 to 2048 unrepeated elements. In order to do so, a legacy eMTC lengh-32 sequence is modified and formed as follows:

$$F_{x32}'=\text{Perm5}[X,P]$$

where $X=\text{mod}(b(\text{SFN}_{4:0} \text{ xor } \text{PCI}_{4:0})+\text{SFN}_{9:5},32)$, and $P=\text{SFN}_{10:5}+64*\text{PCI}_{7:0}$ and the length-64 sequence is obtained by the following equation:

$$F_{x64}=c(\text{mod}\{[F_{x32}'+32*\text{SFN}'_6] \text{ xor } \text{PCI}_{5:0}+\text{SFN}'_{10:6}\}64)$$

Consider the case of $N_{Chan}=64$ channels, where 63 channels are for data and one is an anchor channel, but differently than the previous case the anchor has a fixed location. In various embodiments, the sequence is generate using the following approach.
 1. Select the hopping number in the sequence over which the anchor channel is expected to occur, for instance hop 0;
 2. Generate a sequence length-64 using one of the procedures described above.
 3. Remove from the sequence all the time one of the elements corresponding to the same value, for instance 63.
 4. Add in the position selected in step 1, the specific value that has been removed in step 3.

As an example, consider a sequence length-10, and how the aforementioned procedure would apply in this case. Assume the original length-10 sequence is as follows:
 0 3 6 8 1 2 7 4 9 5-1 3 7 5 9 4 2 8 6 0-5 9 4 3 2 0 8 6 1 7

Now, assume the anchor channel has to occur in the first hop every time, then we remove element 0 from the sequence, which will become a length-9 sequence:
3 6 8 1 2 7 4 9 5-1 3 7 5 9 4 2 8 6-5 9 4 3 2 8 6 1 7
Finally the sequence length-10 is reformed by adding 0 in the first position of each length-9 sequence:
0 3 6 8 1 2 7 4 9 5-0 1 3 7 5 9 4 2 8 6-0 5 9 4 3 2 8 6 1 7
Notice that a similar approach can be adopted if the number of anchor channels is more than 1, and the total number of channels is $N_{Chan}=64$.

As alternative to the embodiment described above, when $N_{Chan}=64$ channels; where 63 channels are for data and one is an anchor channel which is in a fixed location, the following procedure may be used:
1. Select the hopping number in the sequence over which the anchor channel is expected to occur, for instance hop 0;
2. Generate a sequence length-64 using one of the procedures described above.
3. Reorder the sequence such that the element corresponding to the anchor channel corresponds to the first element.
4. The following elements of the new sequence are the elements of the original sequence ordered moving forward or backwards from where the element corresponding to the anchor channel occurs.

As an example, consider a sequence length-10, and how the aforementioned procedure would apply in this case. Assume the original length-10 sequence is as follows:
0 3 6 8 1 2 7 4 9 5-1 3 7 5 9 4 2 8 6 0-5 9 4 3 2 0 8 6 1 7
Assume the anchor channel has to occur in the first hop every time. By following the previously described procedures by reordering the original sequence moving backwards from element corresponding to the anchor channel, the following sequence may be obtained:
0 5 9 4 7 2 1 8 6 3-0 6 8 2 4 9 5 7 3 1-0 2 3 4 9 5 7 1 6 8
In case the ordering is done moving forward from element corresponding to the anchor channel, the following sequence may be obtained:
0 3 6 8 1 2 7 4 9 5-0 1 3 7 5 9 4 2 8 6-0 8 6 1 7 5 9 4 3 2

A similar approach may be adopted if the number of anchor channels is more than 1 and the total number of channels is $N_{Chan}=64$. In various embodiments, the window within which the anchor channel floats is fixed and can be, for example, N=2, N=4, N=8, or N=16. in some embodiments, the position where the anchor occurs is fixed (i.e., W[1,2, ... N]) and it repeats every N elements. In embodiments, W is a pseudorandom sequence obtained as follows:

If N=4, as an example the sequence may be generated as follows:

$$W=\text{Perm5}(X1,P1)+1 \qquad (24)$$

where $$X1=\text{mod}(b4(\text{PCI}_{1:0}+1)+\text{SFN'}_{7:6},4)$$

$$P1=[0\ 0\ 0\ 0\ 0\ 0\ 0\ 0\ 0\ 0\ 0\ 0]$$

$$P1([1])=\text{xor}\ (\text{SFN'}_9,\text{PCI}_0)$$

Where b4 is a lengh-4 sequence, which can be for example b4=[0 1 3 2];

If N=8, as an example the sequence may be generated as follows:

$$W=\text{Perm5}(X1,P1)+1 \qquad (24)$$

where $$X1=\text{mod}(b8(\text{PCI}_{2:0}+1)+\text{SFN'}_{8:6},8)$$

$$P1([0,2,6])=\text{xor}\ (\text{SFN'}_{10},\text{PCI}_{2:0})$$

Where b8 is a lengh-8 sequence, which can be for example b8=[0 1 3 5 2 7 6 4];

If N=2, the anchor position can follow a fix pattern, e.g., 1 2, or 2 1. If N=16, the anchor position pattern can be generated using one of the methods described herein for a length-16 sequence. In various embodiments, the procedure provided above to generate a sequence which contains an anchor channel randomly switched position in a bounded window, can be applied to any of the length-64 sequences described herein.

In some scenarios, the anchor channel is transmitted multiple times by the eNB if the eNB operates as a hybrid system and the UE operates as an FH system. In these scenarios, the UE must skip some of the frequency hopping elements in each frequency hop set in order to receive the anchor information transmitted by the eNB. However, there is no guarantee that the UE will utilize equally all the channels since the skipping is done over a random hop set.

In various embodiments, in order to comply with FCC regulation(s), the sequence can be generated using one of the methodologies discussed herein, and then the sequence is shrunk to the number of channels over which the UE hops when it is not in receiving mode. For example, if the UE uses 64 channels, and the anchor is repeated 4 times, the sequence is reduced to 60 elements by removing element 59-63, such that the sequence is now a lengh-60 pseudo random sequence, e.g.:

| 0  | 26 | 23 | 2  | 10 | 22 | 3  | 8  | 52 | ~~63~~ |
|----|----|----|----|----|----|----|----|----|----|
| 29 | 36 | 16 | 34 | ~~62~~ | 18 | ~~61~~ | 37 | 31 | ~~60~~ |
| 59 | 4  | 27 | 21 | 19 | 25 | 47 | 54 | 12 | 43 |
| 11 | 7  | 41 | 15 | 57 | 6  | 24 | 56 | 55 | 9  |
| 48 | 42 | 13 | 40 | 58 | 53 | 32 | 17 | 33 | 35 |
| 5  | 30 | 50 | 51 | 38 | 1  | 39 | 14 | 20 | 28 |
| 46 | 45 | 49 | 44 |    |    |    |    |    |    |

The elements of the sequence correspond to the channel index for those channel over which the UE transmits. Then the channel index corresponding to the anchor channel indicated with "A" is then added to the shrunk version of the original sequence in those positions where the LTE is expected to puncture the sequence because it will actually be in receiving mode. For example, if the anchor is transmitted periodically every 16 hops starting from the first hop, based on the example above, the sequence is:

| A  | 0  | 26 | 23 | 2  | 10 | 22 | 3  | 8  | 52 |
|----|----|----|----|----|----|----|----|----|----|
| 29 | 36 | 16 | 34 | 18 | 37 | A  | 31 | 59 | 4  |
| 27 | 21 | 19 | 25 | 47 | 54 | 12 | 43 | 11 | 7  |
| 41 | 15 | A  | 57 | 6  | 24 | 56 | 55 | 9  | 48 |
| 42 | 13 | 40 | 58 | 53 | 32 | 17 | 33 | A  | 35 |
| 5  | 30 | 50 | 51 | 38 | 1  | 39 | 14 | 20 | 28 |
| 46 | 45 | 49 | 44 |    |    |    |    |    |    |

In one embodiment, the procedure above can be used for every methodologies discussed herein, and for every length of the sequence as well as for every patterns of the anchor channel. In some embodiments, in order to account for the anchor channels, and in order to account for their skipping the length-64 sequence is generated by using SFN" instead of SFN', where SFN"=SFN'−⌊SFN'/64•M⌋ where M is the number of anchor channels occurring within a hop set.

Hopping Sequence with Constraint

In embodiments, the hopping sequence can be generated such that the channels between two consecutive hops are close to each other, and not further than a certain distance in frequency domain. In embodiments, the sequence can be obtained as follows:

1. Generate all possible permutations given the whitelist Φ with dimension T=|Φ|, which would result in a matrix of dimension T!×T. For instance given T=4: perm(Φ)=[4, 3,2,1; 4,3,1,2; 4,2,3,1; 4,2,1,3; 4,1,3,2; 4,1, 2,3; 3,4,2,1; 3,4,1,2; 3,2,4,1; 3,2,1,4; 3, 1,4,2; 3,1,2,4; 2,4,3,1; 2,4,1,3; 2,3,4,1; 2,3,1,4; 2,1,4,3; 2,1,3,4; 1,4, 3,2; 1,4,2,3; 1,3,4,2; 1,3,2,4; 1,2,4,3; 1,2,3,4];
2. For the set perm(Φ), remove all the row that contain elements such that adjacent elements are spread more than a certain value M (i.e, $|a_i-a_{i+1}|>=M$). Also remove all the row, such as the last element of a row and the first element of the next row are too much spread. In this particular case, if M=2 the set Ψ={perm(Φ)\ $Y_z \subset$ perm(Φ)|z: $|a_i-a_{i+1}|>=M$}, is the same as perm (Φ), while for M=1 the set Ψ would Ψ={0,3,2,1;1,2, 3,4};
3. The hopping set is then obtained by indexing a specific element of Ψ, which can be function of PCI, SFN/HFN. For instance the hopping sequence can be Ψ{[PCI+ floor(SFN'/|Φ|)]mod |Ψ|+1, SFN' mod |Φ|+1}, where SFN' is function of SFN, and or HFN.

Primary and Secondary Anchor Channel

In various embodiments, multiple anchors can be defined. In various embodiments, a primary and a secondary anchor channel may be defined. In embodiments, the primary anchor channel(s) may comprise one of the following: U-NPSS/U-NSSS U-PBCH and DL control and data transmission. In embodiments, the secondary anchor channel(s) may comprise U-NPSS/U-NSSS and may not include U-PBCH. In embodiments, the secondary anchor channel may include both U-NPSS/U-NSSS and U-PBCH. In embodiments, the secondary anchor or anchors are configured in system information block type 1 (SIB1). In embodiments, the secondary channel may occur periodically in time, but over a different frequency channel. In some cases, an exact position of the secondary anchor channel(s) may be determined or calculated based on SFN' and PCI based on the how the frequency hopping sequence (or frequency hopping pattern) is generated. In various embodiments, the secondary anchor channels and the primary anchor channel may be transmitted evenly over time (e.g., primary in first hop and secondary in 33th hop for 64 channels). In various embodiments, the secondary channel occurs in time after X hops, where X can be either fixed or configured. In embodiments, if multiple anchor channels are transmitted, the secondary anchor channels may be transmitted separated over each other through a specific offset value, which may be a fixed value or configured.

In Example 1, an apparatus for an evolved Node B (eNB) is configured to operate in a Multefire (MF) narrowband internet-of-things (NB IoT) cell over unlicensed spectrum, the apparatus comprising: memory and processing circuitry, wherein the processing circuitry is to: communicate with one or more user equipments (UEs) over a specified number N of data channels separated in frequency where N=64; wherein the frequencies of the data channels are specified by a frequency hopping sequence $F_{X64}$ that is a function of a frequency hopping index denoted as SFN or SFN', wherein both SFN and SFN' are proportional to a system frame number, and a function of a cell identity (PCI); encode an anchor channel for transmission to the one or more UEs at a fixed frequency interspersed in time with the data channels; and, wherein the frequency hopping index SFN or SFN' is made such that the data channels are numbered consecutively in accordance with the system frame number while skipping the anchor channels that are interspersed therewith.

In Example 2, an apparatus for a user equipment (UE) is configured to operate in a Multefire (MF) narrowband internet-of-things (NB IoT) cell over unlicensed spectrum, the apparatus comprising: memory and processing circuitry, wherein the processing circuitry is to: communicate with an evolved Node B (eNB) over a specified number N of data channels separated in frequency where N=64; wherein the frequencies of the data channels are specified by a frequency hopping sequence $F_{X64}$ that is a function of a frequency hopping index denoted as SFN or SFN', wherein both SFN and SFN' are proportional to a system frame number, and a function of a cell identity (PCI);

calculate the frequency hopping sequence $F_{X64}$ as:

$$F_{X64}=(c([F_{x32}'+32*SFN'_5])\oplus PCI_{5:0}+SFN'_{10:6}) \bmod 64$$

where c(i) is an indexed length-64 sequence stored in memory that is composed of 64 unique elements from 0 to 63, "⊕" is the exclusive-or operation, $SFN'_n$ is the nth bit of the binary representation of SFN', $SFN'_{m:n}$ denotes the mth through nth bits of the binary representation of SFN', $PCI_{m:n}$ denotes the mth through nth bits of the binary representation of the cell identity PCI, $F_{x32}'$ is calculated as:

$$F_{x32}'=\text{Perm5}[X,P]$$

where Perm5 is an operator that permutes a 5-bit input vector X in accordance with a 14-bit control vector P to result in a 5-bit output, where X is calculated as:

$$X=(b(SFN_{4:0}\oplus PCI_{4:0})+SFN_{9:5}) \bmod 32,$$

where b(i) is an indexed length-32 sequence stored in memory that is composed of 32 unique elements from 0 to 31, and where P is calculated as:

$$P=SFN_{10:5}+64*PCI_{7:0}.$$

Example 1 may further comprise a radio transceiver; wherein the memory is further configured to store the frequency hopping sequence, the b(i) sequence, and/or the c(i) sequence; wherein the processing circuitry is further to: calculate the frequency hopping sequence $F_{X64}$ as:

$$F_{X64}=(c([F_{x32}'+32*SFN'_5])\oplus PCI_{5:0}+SFN'_{10:6}) \bmod 64$$

where c(i) is an indexed length-64 sequence that is composed of 64 unique elements from 0 to 63, "⊕" is the exclusive-or operation, $SFN'_n$ is the nth bit of the binary representation of SFN', $SFN'_{m:n}$ denotes the mth through nth bits of the binary representation of SFN', $PCI_{m:n}$ denotes the mth through nth bits of the binary representation of the cell identity PCI, $F_{x32}'$ is calculated as:

$$F_{x32}'=\text{Perm5}[X,P]$$

where Perm5 is an operator that permutes a 5-bit input vector X in accordance with a 14-bit control vector P to result in a 5-bit output, where X is calculated as:

$$X=(b(SFN_{4:0}\oplus PCI_{4:0})+SFN_{9:5}) \bmod 32,$$

where b(i) is an indexed length-32 sequence that is composed of 32 unique elements from 0 to 31, and where P is calculated as:

$$P=SFN_{10:5}+64*PCI7:0;$$

wherein the sequence c(i) is defined as:
  c(i)={0,23,62,8,43,16,47,19,61,29,59,22,52,63,26,31,2,
    18,11,36,54,21,3,37,10,34,7,4, 0,27,12,25,14,57,41,32,
    9,58,45,20,39,13,33,50,56,42,48,15,5,17,6,49,40,1,28,
    55,35,53,24,44,51,38,30,46}; wherein the sequence
    b(i) is defined as:
  b(i)={0,14,1,16,24,11,22,3,12,13,9,19,5,25,2,17,8,23,15,
    28,10,27,29, 21,7,31,6,20,30,4,18,26}; wherein the
    processing circuitry is further to encode an anchor
    channel for transmission to the one or more UEs at a
    fixed frequency interspersed in time with the data
    channels; and/or wherein the frequency hopping index
    SFN or SFN' is replaced with a frequency hopping
    index SFN" calculated as:

$$SFN''=SFN'-\lfloor(SFN'/64)*M\rfloor$$

where "$\lfloor\rfloor$" is the floor operator and where M is the number of anchor channels transmitted during the course of 64 consecutive frequency hops.

Example 2 may further comprise a radio transceiver; wherein the memory is further configured to store the frequency hopping sequence, the b(i) sequence, and/or the c(i) sequence; wherein the sequence c(i) is defined as:
  c(i)={0,23,62,8,43,16,47,19,61,29,59,22,52,63,26,31,2,
    18,11,36,54,21,3,37,10,34,7,4, 60,27,12,25,14,57,41,
    32,9,58,45,20,39,13,33,50,56,42,48,15,5,17,6,49,40,1,
    28, 55,35,53,24,44,51,38,30,46}.
wherein the sequence b(i) is defined as:
  b(i)={0,14,1,16,24,11,22,3,12,13,9,19,5,25,2,17,8,23,15,
    28,10,27,29, 21,7,31,6,20,30,4,18,26}; wherein the
    processing circuitry is further to receive an anchor
    channel from the eNB at a fixed frequency interspersed
    in time with the data channels; wherein the frequency
    hopping index SFN or SFN' is replaced with a frequency hopping index SFN" calculated as:

$$SFN''=SFN'-\lfloor(SFN'/64)*M\rfloor$$

where "$\lfloor\rfloor$" is the floor operator and where M is the number of anchor channels transmitted during the course of 64 consecutive frequency hops; and/or wherein the frequency hopping index SFN or SFN' is replaced with a frequency hopping index SFN" such that the data channels are numbered consecutively in accordance with the system frame number while skipping the anchor channels that are interspersed therewith.

In Example 3, a computer readable medium comprises instructions for carrying out the functions of the processing circuitry in Examples 1 or 2.

Figure 8:
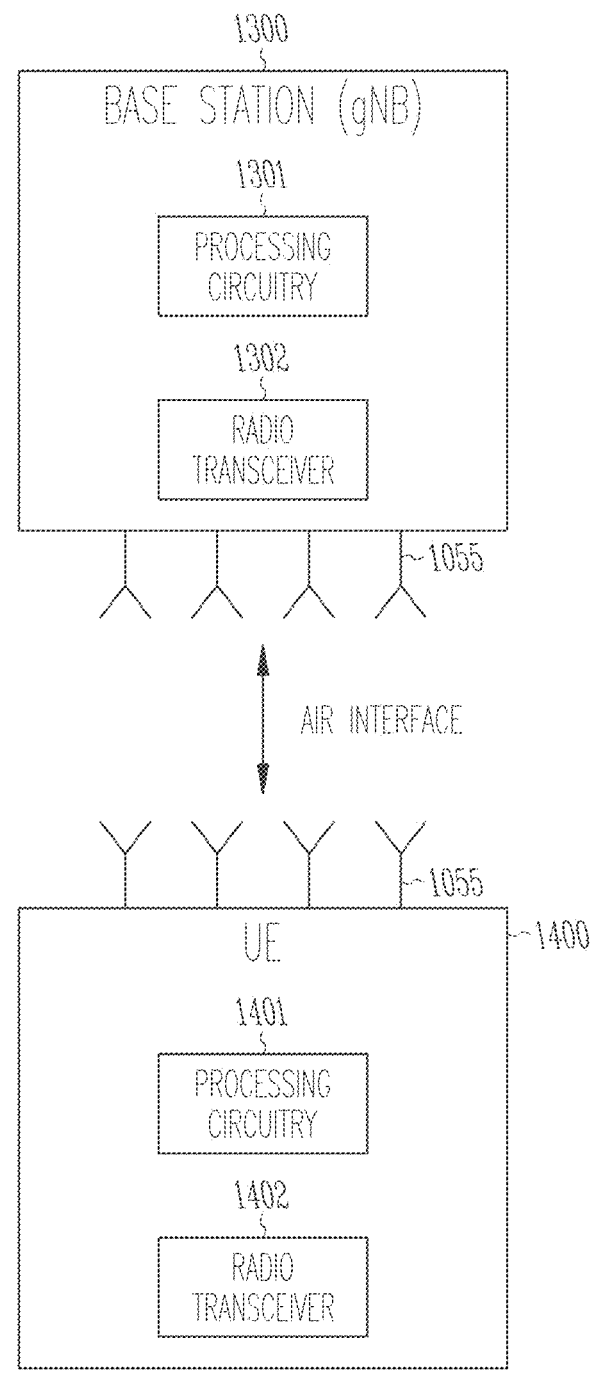
FIG. 8 illustrates an example UE and a base station (BS) such as an el B or gNB according to some embodiments.

In Long Term Evolution (LTE) and 5G systems, a mobile terminal (referred to as a User Equipment or UE) connects to the cellular network via a base station (BS), referred to as an evolved Node B or eNB in LTE systems and as a next generation evolved Node B or gNB in 5G or NR systems. FIG. 8 illustrates an example of the components of a UE 1400 and a base station (e.g., eNB or gNB) 1300. The BS 1300 includes processing circuitry 1301 connected to a radio transceiver 1302 for providing an air interface. The UE 1400 includes processing circuitry 1401 connected to a radio transceiver 1402 for providing an air interface over the wireless medium. Each of the transceivers in the devices is connected to antennas 1055. The antennas 1055 of the devices faun antenna arrays whose directionality may be controlled by the processing circuitry. The memory and processing circuitries of the LT and/or BS may be configured to perform the functions and implement the schemes of the various embodiments described herein.

The above detailed description includes references to the accompanying drawings, which thin). a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples to using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the disclosure is not limited in this respect. An example LTE system includes a number of mobile stations, defined by the LTE specification as User Equipment (UE), communicating with a base station, defined by the LTE specifications as an eNodeB.

Antennas referred to herein may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to ⅒ of a wavelength or more.

In some embodiments, a receiver as described herein may be configured to receive signals in accordance with specific communication standards, such as the Institute of Electrical and Electronics Engineers (IEEE) standards including IEEE 802.11-2007 and/or 802.11(n) standards and/or proposed specifications for WLANs, although the scope of the disclosure is not limited in this respect as they may also be suitable to transmit and/or receive communications in accordance with other techniques and standards. In some embodiments, the receiver may be configured to receive signals in accordance with the IEEE 802.16-2004, the IEEE 802.16(e) and/or IEEE 802.16(m) standards for wireless metropolitan area networks (WMANs) including variations and evolutions thereof, although the scope of the disclosure is not limited in this respect as they may also be suitable to transmit and/or receive communications in accordance with other techniques and standards. In some embodiments, the receiver may be configured to receive signals in accordance with the Universal Terrestrial Radio Access Network (UTRAN) LTE communication standards. For more information with respect to the IEEE 802.11 and IEEE 802.16 standards, please refer to "IEEE Standards for information Technology—Telecommunications and Information Exchange between Systems"—Local Area Networks—Specific Requirements Part 11 "Wireless LAN Medium Access Control (MAC) and Physical Layer (PHY), ISO/11-C 8802-11: 1999", and Metropolitan Area Networks—Specific Requirements Part 16: "Air Interface for Fixed Broadband Wireless Access Systems," May 2005 and related amendments/versions. For more information with respect to UTRAN LTE standards, see the 3rd Generation Partnership Project (3GPP) standards for UTRAN-LTE, release 8, March 2008, including variations and evolutions thereof.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. An apparatus comprising:
at least one processor configured to cause a base station to operate in a Multefire (MF) narrowband internet of things (NB IoT) cell over unlicensed spectrum, wherein the at least one processor is configured to:
communicate with one or more user equipments (UEs) over a specified number N of data channels separated in frequency where N=64;
wherein the frequencies of the data channels are specified by a frequency hopping sequence FX64 that is a function of a frequency hopping index, denoted as SFN', and a function of a cell identity (PCI), wherein SFN' is a function of a system frame number;
encode an anchor channel for transmission to the one or more UEs at a fixed frequency interspersed in time with the data channels,
wherein the frequency hopping index SFN' is made such that the data channels are hopped in accordance with the system frame number while skipping the anchor channels that are interspersed therewith; and
calculate the frequency hopping sequence $F_{X64}$ as:

$$F_{X64}=(c([F_{x32}'+32*SFN'_5])\oplus PCI_{5:0}+SFN'_{10:6}) \bmod 64$$

where c(i) is an indexed length-64 sequence stored in memory that is composed of 64 unique elements from 0 to 63, "⊕" is the exclusive-or operation, $SFN'_n$ is the nth bit of the binary representation of SFN', $SFN'_{m:n}$ denotes the mth through nth bits of the binary representation of SFN', $PCI_{m:n}$ denotes the mth through nth bits of the binary representation of the cell identity PCI, $F_{x32}'$ is calculated as:

$$F_{x32}'=\text{Perm5}[X,P]$$

where Perm5 is an operator that permutes a 5-bit input vector X in accordance with a 14-bit control vector P to result in a 5-bit output.

2. The apparatus of claim 1, wherein X is calculated as:

$$X=(b(SFN_{4:0}\oplus PCI_{4:0})+SFN_{9:5}) \bmod 32,$$

where b(i) is an indexed length-32 sequence stored in memory that is composed of 32 unique elements from 0 to 31, and where P is calculated as:

$$P=SFN_{10:5}+64*PCI_{7:0}.$$

3. The apparatus of claim 2, wherein the sequence c(i) is defined as: c(i)={0,23,62,8,43,16,47,19,61,29,59,22,52,63, 26,31,2,18,11,36,54,21,3,37,10,34,7,4,60,27,12,25,14,57, 41,32,9,58.45,20,39,13,33,50,56,42,48,15,5,17,6,49,40,1, 28,55,35,53,24,44,51,38,30,46}.

4. The apparatus of claim 2, wherein the sequence b(i) is defined as: b(i)={0,14,1,16,24,1,22,3,12,13,9,19,5,25,2,17, 8,23,15,28,10,27,29,21,7,31,6,20,30,4,18,26}.

5. The apparatus of claim 1 wherein the frequency hopping index SFN' is replaced with a frequency hopping index SFN" calculated as:

$$SFN''=SFN'-I(SFN'/64)*MJ$$

where "[ ]" is the floor operator and where M is the number of anchor channels transmitted during the course of 64 consecutive frequency hops.

6. The apparatus of claim 1, wherein $F_{x32}'$ is a function of the system frame number and the PCI.

7. An apparatus comprising:
at least one processor configured to cause a user equipment (UE) to operate in a Multefire (MF) narrowband internet-of-things (NB IoT) cell over unlicensed spectrum, wherein the at least one processor is configured to:
communicate with base station over a specified number N of data channels separated in frequency where N=64;
wherein the frequencies of the data channels are specified by a frequency hopping sequence $F_{X64}$ that is a function of a frequency hopping index, denoted as SFN', and a function of a cell identity (PCI), wherein SFN' is a function of a system frame number; calculate the frequency hopping sequence $F_{X64}$ as:

$$F_{X64}=(c([F_{x32}'+32*SFN'_5])\oplus PCI_{5:0}+SFN'_{10:6})\bmod 64$$

where c(i) is an indexed length-64 sequence stored in memory that is composed of 64 unique elements from 0 to 63, "⊕" is the exclusive-or operation, $SFN'_n$ is the nth bit of the binary representation of SFN', $SFN'_{m:n}$ denotes the mth through nth bits of the binary representation of SFN', $PCI_{m:n}$ denotes the mth through nth bits of the binary representation of the cell identity PCI, $F_{x32}'$ is calculated as:

$$F_{x32}'=\text{Perm5}[X,P]$$

where Perm5 is an operator that permutes a 5-bit input vector X in accordance with a 14-bit control vector P to result in a 5-bit output.

8. The apparatus of claim 7, wherein the sequence c(i) is defined as c(i)={0,23,62,8,43,16,47,19,61,29,59,22,52,63, 26,31,2,18,11,36,54,21,3,37,10,34,7,4, 60,27,12,25,14,57, 41,32,9,58,45,20,39,13,33,50,56,42,48,15,5,17,6,49,40,1, 28, 55,35,53,24,44,51,38,30,46}.

9. The apparatus of claim 7, wherein the at least one processor is further configured to receive an anchor channel from the base station at a fixed frequency interspersed in time with the data channels.

10. The apparatus of claim 9, wherein the frequency hopping index SFN is replaced with a frequency hopping index SFN" calculated as:

$$SFN''=SFN'-[(SFN'/64)*M]$$

where "[ ]" is the floor operator and where M is the number of anchor channels transmitted during the course of 64 consecutive frequency hops.

11. The apparatus of claim 9, wherein the frequency hopping index SFN' is replaced with a frequency hopping index SFN" such that the data channels are numbered consecutively in accordance with the system frame number while skipping the anchor channels that are interspersed therewith.

12. The apparatus of claim 7, wherein X is calculated as:

$$X=(b(SFN_{4:0}\oplus PCI_{4:0})+SFN_{9:5})\bmod 32,$$

where b(i) is an indexed length-32 sequence stored in memory that is composed of 32 unique elements from 0 to 31, and where P is calculated as:

$$P=SFN_{10:5}+64*PCI_{7:0}.$$

13. The apparatus of claim 12, wherein the sequence b(i) is defined as: b(i)={0,14,1,16,24,11,22,3,12,13,9,19,5,25,2, 17,8,23,15,28,10,27,29, 21,7,31,6,20,30,4,18,26}.

14. The apparatus of claim 7, wherein $F_{x32}'$ is a function of the system frame number and the PCI.

15. A non-transitory computer-readable storage medium storing instructions executable by at least one processor of a user equipment (UE) to:
operate in a Multefire (MF) narrowband internet-of-things (NB IoT) cell over unlicensed spectrum;
communicate with base station over a specified number N of data channels separated in frequency where N=64;

wherein the frequencies of the data channels are specified by a frequency hopping sequence $F_{X64}$ that is a function of a frequency hopping index denoted as SFN or SFN', wherein both SFN and SFN' are proportional to a system frame number, and a function of a cell identity (PCI); calculate the frequency hopping sequence $F_{X64}$ as:

$$F_{X64}=(c([F_{x32}'+32*SFN'_5])\oplus PCI_{5:0}+SFN'_{10:6})\bmod 64$$

where c(i) is an indexed length-64 sequence that is composed of 64 unique elements from 0 to 63, "⊕" is the exclusive-or operation, $SFN'_n$ is the nth bit of the binary representation of SFN', $SFN'_{m:n}$ denotes the mth through nth bits of the binary representation of SFN', $PCI_{m:n}$ denotes the mth through nth bits of the binary representation of the cell identity PCI, $F_{x32}'$ is calculated as:

$$F_{x32}'=\text{Perm5}[X,P]$$

where Perm5 is an operator that permutes a 5-bit input vector X in accordance with a 14-bit control vector P to result in a 5-bit output, where X is calculated as:

$$X=(b(SFN_{4:0}\oplus PCI_{4:0})+SFN_{9:5})\bmod 32,$$

where b(i) is an indexed length-32 sequence that is composed of 32 unique elements from 0 to 31, and where P is calculated as:

$$P=SFN_{10:5}+64*PCI_{7:0}.$$

16. The non-transitory computer-readable storage medium of claim 15, wherein the sequence c(i) is defined as: c(i)={0,23,62,8,43,16,47,19,61,29,59,22,52,63,26,31,2,18, 11,36,54,21,3,37,10,34,7,4, 60,27,12,25,14,57,41,32,9,58, 45,20,39,13,33,50,56,42,48,15,5,17,6,49,40,1,28, 55,35,53, 24,44,51,38,30,46}.

17. The non-transitory computer-readable storage medium of claim 15, wherein the sequence b(i) is defined as: b(i)={0,14,1,16,24,11,22,3,12,13,9,19,5,25,2,17,5,23,15,25, 10,27,29, 21,7,31,6,20,30,4,18,26}.

18. The non-transitory computer-readable storage medium of claim 15, further comprising instructions to receive an anchor channel from the base station at a fixed frequency interspersed in time with the data channels.

19. The non-transitory computer-readable storage medium of claim 15, further comprising instructions that replace the frequency hopping index SFN or SFN' with a frequency hopping index SFN" calculated as:

$$SFN''=SFN'-[(SFN'/64)*M]$$

where "[ ]" is the floor operator and where M is the number of anchor channels transmitted during the course of 64 consecutive frequency hops.

20. The non-transitory computer-readable storage medium of claim 15, wherein the frequency hopping index SFN or SFN' is replaced with a frequency hopping index SFN" such that the data channels are numbered consecutively in accordance with the system frame number while skipping the anchor channels that are interspersed therewith.

* * * * *